United States Patent [19]

Reeber et al.

[11] 3,863,544
[45] Feb. 4, 1975

[54] ENGRAVING AND COPY MILLING MACHINE HAVING A PANTOGRAPH

[75] Inventors: Rudolf Reeber, Neukeferloh; Peter Hofmeister; Heinrich Strobl, both of Munich, all of Germany; Johann Müller, deceased, late of Unterhaching, Germany by Katharina Müller, legal representative

[73] Assignee: Friedrich Deckel Aktiengesellschaft, Munich, Germany

[22] Filed: June 11, 1973

[21] Appl. No.: 369,052

[30] Foreign Application Priority Data
June 12, 1972 Germany............................ 2228575
Mar. 7, 1973 Germany............................ 2311149

[52] U.S. Cl. .................................. 90/13.1, 33/25 B
[51] Int. Cl. ................................................ B23c 1/16
[58] Field of Search ............. 90/13.1; 33/25 R, 25 B

[56] References Cited
UNITED STATES PATENTS
2,626,540   1/1953   Eserkaln ............................ 90/13.1
2,852,984   9/1958   Donohoo ............................ 90/13.1
3,211,061   10/1965  Cretsinger .......................... 90/13.1
3,460,433   8/1969   Pecchioli ............................ 90/13.1
3,584,535   6/1971   Rossberger ......................... 90/13.1

FOREIGN PATENTS OR APPLICATIONS
443,898   5/1927   Germany ............................ 90/13.1

Primary Examiner—Andrew R. Juhasz
Assistant Examiner—Z. R. Bilinsky
Attorney, Agent, or Firm—Woodhams, Blanchard and Flynn

[57] ABSTRACT

An engraving and copying milling machine. The machine has an upstanding column, a suitably driven tool spindle and a vertically adjustable worktable and pattern tables. The pantograph is arranged on a console which is supported for vertical adjustment on the upstanding column. The pantograph is also supported, through a pantograph carrier, for pivotal movement relative to the console about a horizontal axis.

5 Claims, 4 Drawing Figures

ENGRAVING AND COPY MILLING MACHINE HAVING A PANTOGRAPH

The invention relates to a copying type of milling machine, same including a column, a pantograph with a tracer which pantograph is arranged on the column for pivoting about a horizontal axis and a suitable motor driven tool spindle. A worktable is arranged on the column front and adjustable at least for height together with an adjustable pattern table.

Such machines permit enlarging or reducing copy milling operations corresponding to a pattern. The alignment and relative positions of workpiece and the pattern can in such a device be adjusted through a selected zone by the adjustability of the work or pattern table.

Engraving and copy milling machines having a pantograph are already known wherein the pantograph is pivotable about a horizontal axis which is fixedly connected to the machine column (for example Deckel GK 21). The worktable in this machine is adjustable in three axial directions, the pattern table is adjustable vertically and in longitudinal direction of the machine. The swivel movement of the pantograph results in the vertical path of work, while the adjustability of the worktable serves only the relative adjustment of the workpiece with respect to the tool. However, this system is disadvantageous in that the pantograph can be used only in a small angular range below and above its horizontal position. A further disadvantage of the known machine is in that the free clearance height, that is, the distance between the horizontal pantograph and the upper edge of the machine column, is for reasons of machine rigidity relatively small so that the dimensional range of workpieces which can be accepted is limited.

The purpose of the invention is to produce a machine of the type mentioned above which avoids the disadvantage of the fixed operating level and the small clearance height. This purpose is attained according to the invention by supporting the pantograph, in addition to its various possible movements in the known machine, on a console or the like which is movable vertically on the machine column.

The vertically adjustable mounting of the pantograph permits it to adjust the operating level of the machine. For this purpose the workpiece and the pattern are moved into the most desirable operating position and the vertically adjustable pantograph is adjusted to said operating position by moving the console. In this manner, it becomes possible to carry out very fine engraving operations with the operator seated although milling operations for which more force must be used will still require him to stand. Further, the machine of the invention permits a greater range of possible workpiece dimensions because the clearance height can be enlarged at any time by moving the pantograph upwardly. During operations where a large clearance height is not important, the console which carries the pantograph is again moved downwardly so as to secure a rigidity of the pantograph mounting equal to that of known machines.

According to a further characteristic of the invention, in a machine in which the worktable is conventionally movable in a transverse direction, the machine column is almost as high in its lowermost position as the lower edge of the said worktable. Thus, it is assured that the cross path of the table can be used in any position and not only, as in the known constructions, at certain vertical adjustments. The inventive construction in which the machine column is lower than in known machines supplements the characteristic of the vertically adjustable pantograph in an ideal manner because in this manner the entire distance between the lowermost position of the worktable and the uppermost position of the pantograph is available as clearance height.

According to a further characteristic of the invention the vertical range of adjustment of the worktable in the uppermost position overlaps that of the tool connected with the pantograph in the lower position. The amount of such overlapping plus the height of the workpiece, and of the subframes if present, represent the range within which the operating height can be adjusted as will be explained in connection with the exemplary embodiment.

According to the invention the drive motor for driving the tool spindle is arranged on the console and a counterbalance spring for balancing the pantograph weight is arranged within the console. Both are fixedly connected to the console and move up and down with same.

One exemplary embodiment of the invention is illustrated in the drawings and is described more in detail hereinafter.

Figure 1:
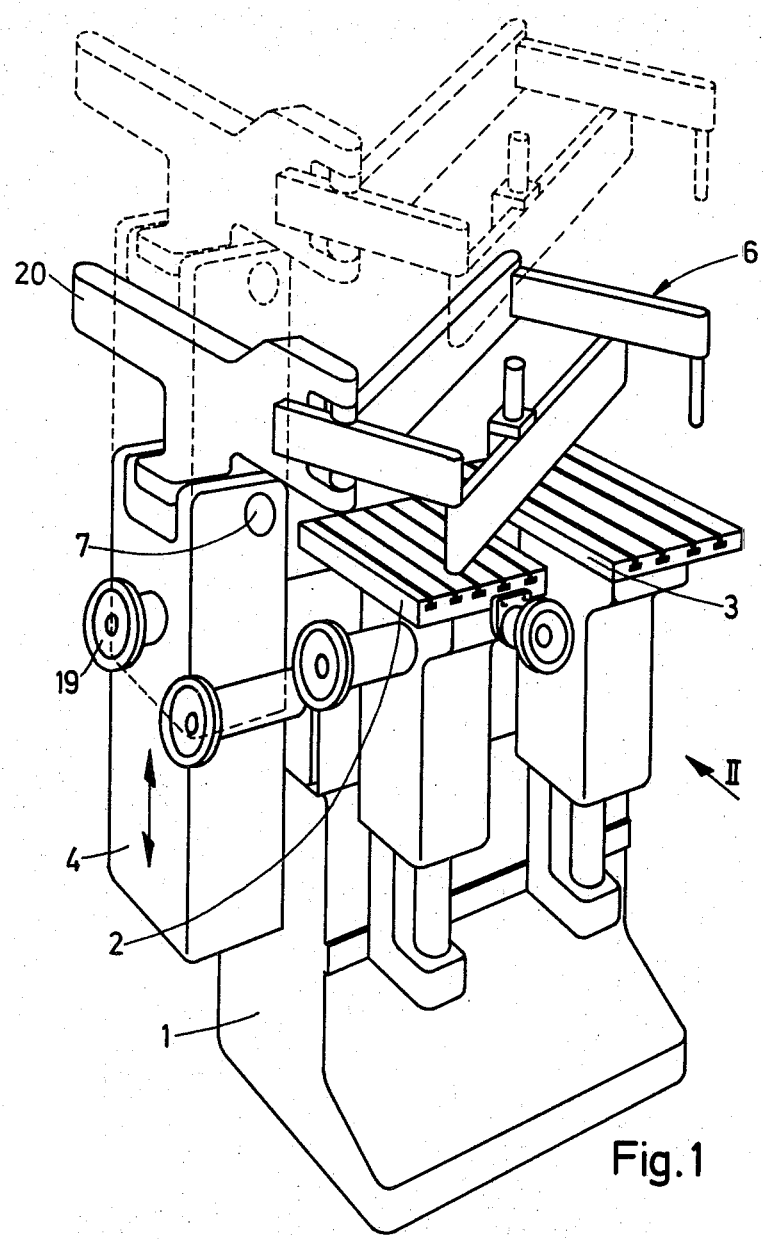
FIG. 1 is a perspective illustration of an engraving machine and a copy milling machine having a vertically adjustable pantograph.

The copy milling machine illustrated in FIG. 1 includes a machine column 1 which is mounted on a column base. A worktable 2 is arranged on the machine column and is adjustable in three axes and a pattern table 3 is adjustable vertically and horizontally of the machine.

The front side of the column 1 carries a console 4 which is shiftable vertically by a hand wheel 19. On the upper side of the console a common pantograph 6 is, through a pantograph carrier 20, supported pivotably about a horizontal axis 7 which lies transversely of the machine. The movement of the pantograph in the horizontal pantograph plane and the pivoting about the axis 7 illustrate the actual movements of operation which permit a three-dimensional tracing and working. The adjustment of the tool and the pattern relative to the pantograph can be obtained by the adjustable tables 2 and 3.

The vertically shiftable support of the pantograph on the console 4 permits additional adjustment of the copy milling machine to workpieces having large vertical dimensions, namely, to enlarge the clearance height. Furthermore, it is also possible to adjust vertically in a desired zone the entire arrangement, namely the worktable 2, the pattern table 3 and the pantograph 6, whereby the relative position of the tables to the pantograph is maintained. In this manner the copy milling machine can be adjusted to various operating heights so that it is, for example, possible for an operator to engrave while sitting and to mill while standing. FIG. 1 illustrates the console 4 with the pantograph 6 in a lower position (solid lines) and an upper position (dashed lines).

Figure 2:
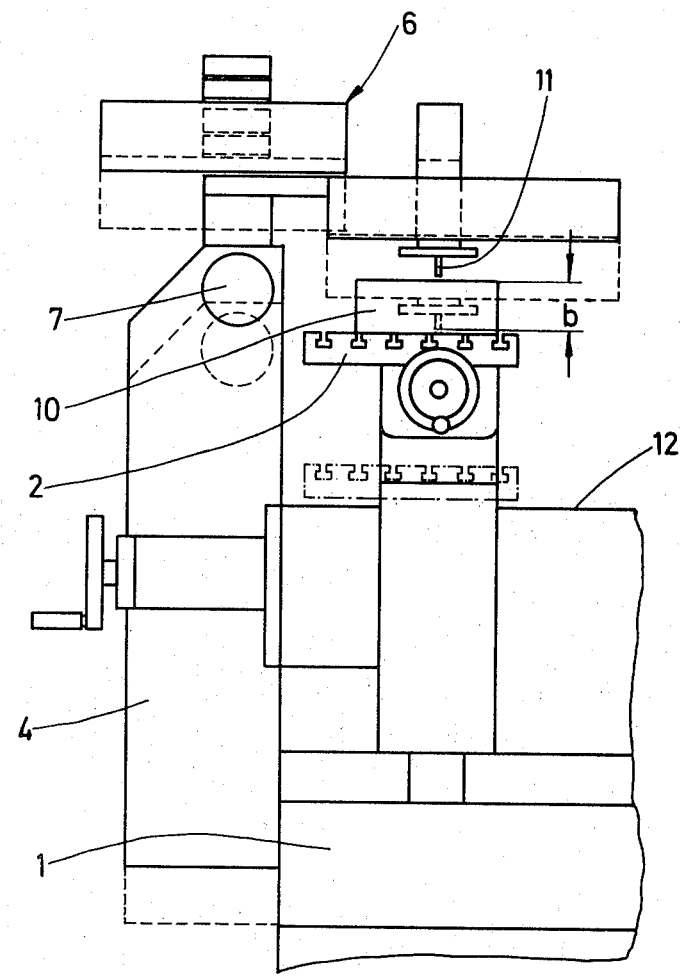
FIG. 2 is a partial view of the machine of FIG. 1 taken in the direction of the arrow II.

FIG. 2 schematically illustrates a portion of the copy milling machine of FIG. 1 taken in the direction of the arrow II. The worktable 2 carries a workpiece 10 which is to be worked by the tool 11. The worktable 2 is in its highest position, the lowermost position of the pantograph 6 with the tool 11 being indicated by broken lines. Thus, there is provided a possible range of adjustment b of the operating level of approximately the dimension between the cutting edge of the tool in its lowermost position and the upper edge of the workpiece 10 in its uppermost position. This means that it is possible, in the example of FIG. 2, to lower the worktable through the range of adjustment b and to adjust the pantograph by means of the console 4 by the same amount (indicated by broken lines), whereby the entire work capacity of the pantograph is maintained.

As can also be recognized from FIG. 2, the machine column is only as high as the projection of the worktable in its lowermost position (illustrated by dash-dotted lines) above the upper edge 12 of the column. Thus, the cross path of the table can be fully used in any vertical position without the table or a workpiece mounted thereon encountering the column.

Figure 3:
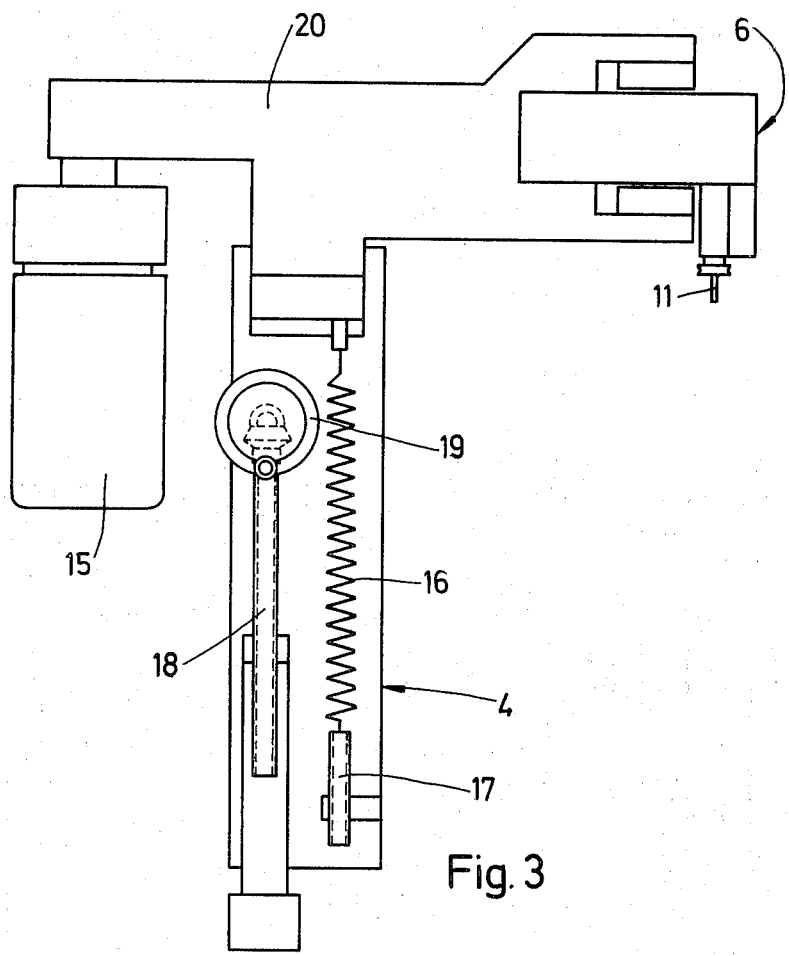
FIG. 3 is a schematic illustration of the console with the work spindle drive, the counterbalance mechanism and the adjusting drive of the console.

As can particularly be seen from FIG. 3, the drive motor 15 for the tool is fixedly connected to the pantograph carrier 20 and is thus movable along with the console 4. In this manner, in adjusting the console no change in the relative position between the drive motor and the pantograph occurs so that for example coupling mechanisms which are adjustable in length or the like are not required.

Between the pantograph carrier 20 and a fixed point of the console 4 there is arranged a counterbalance spring 16 which serves in a conventional manner to balance the pantograph weight. This counterbalance spring is variable in its tensions by means of a threaded rod 17 to which it is secured at its lower end and which is operated externally in a manner which is not illustrated in detail. The counterbalance mechanism also moves along with the console 4 during a vertical adjustment of the console 4 so that this adjustment has no effect on the adjustment of the spring.

A spindle drive 18 is used to adjust the console 4, which spindle drive can be driven in a conventional manner by a hand wheel 19. The spindle drive is, for example, supported axially nonmovably in the console 4 and engages a nut which is fixed to the machine column.

Figure 4:
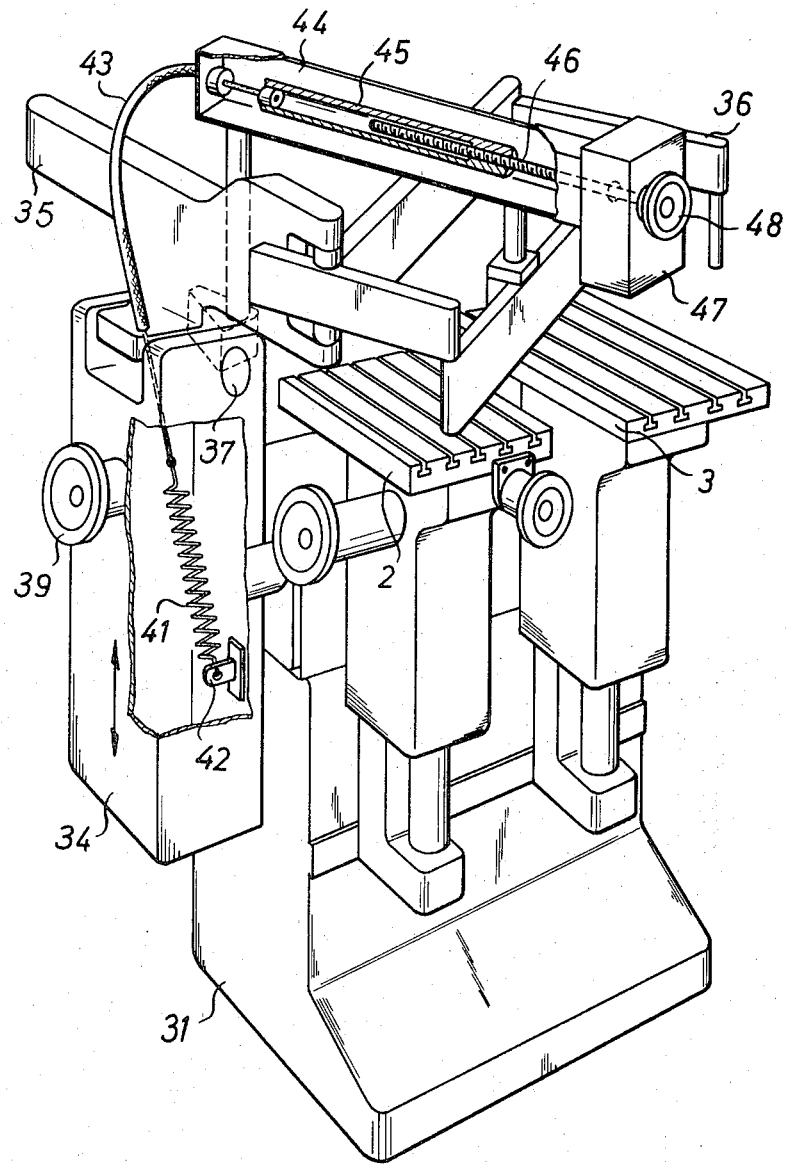
FIG. 4 illustrates a modified embodiment.

In the embodiment of the invention shown in FIG. 4, there are provided certain improvements over the above-described machine, particularly in the device for adjusting the counterbalance spring in order that the adjustment of the spring supporting means can be effected in a simple manner from the operator's position during the machining operation.

This purpose is attained in this embodiment by connecting the movable end of the counterbalance spring to a Bowden wire or the like which in turn is operable by an adjustment mechanism arranged within the reach of the operator.

The Bowden wire thus permits the shifting of the actual adjusting member to any desired point so that the operator can, for example, with one hand during the actual machining operation make adjustment of the counterbalance spring.

In this embodiment, it is provided, in a machine with a control panel mounted on a swingable arm, that the end of the counterbalance spring associated with the pantograph carrier is connected to the Bowden wire. The casing of the Bowden wire is supported at one end against the pantograph carrier and on the other end against the arm of the control panel. The Bowden wire is operated by an adjusting spindle which is arranged in the arm and is driven by a hand wheel arranged on the control panel.

The operator thus finds the hand wheel within an advantageous reach from the place where the other control buttons of the machine are arranged. In addition, the position of the control panel can be adjusted by means of the swingable arm within a predetermined zone at different locations of the operator.

Referring now more specifically to FIG. 4, on column 31 which in a conventional manner has a worktable 32 and a pattern table 33, there is arranged a vertically adjustable console 34 which carries on its upper end a pantograph carrier 35 pivotable about a horizontal axis 37. The pantograph 36 is secured in a conventional manner on said pantograph carrier. The console 34 is vertically adjustable by means of a hand wheel 39.

The counterbalance spring 41 for balancing the pantograph weight is arranged within the console 34. The spring 41 is hinged at its lower end to a fixed point 42 of the console. The upper end of the counterbalance spring is connected to the core of a Bowden wire 43, the casing of which is supported on its one end on the pantograph carrier and at its other end on the arm 44.

The free end of the core of the Bowden wire is secured on a sleeve 45 which can be moved in its longitudinal direction by an adjusting spindle 46 which can be screwed into said sleeve. Through this the initial tension of the counterbalance spring is adjusted.

The adjusting spindle 46 is guided through the control panel 47 which is secured on the arm 44 and carries a hand wheel 48 as an operating element.

The arm is swingable in a conventional and therefore not further illustrated manner in a horizontal plane so that the operator can adjust the control panel and thus the operating element for adjusting the counterbalance mechanism into a desired position.

Although a particular preferred embodiment of the invention has been disclosed above for illustrative purposes, it will be understood that variations or modifications thereof which lie within the scope of the appended claims are fully contemplated.

We claim:

1. An engraving and copy milling machine, comprising:

means defining a machine column;

means defining a console mounted on said machine column means;

pantograph means including a tracer, said pantograph means being mounted on said console means;

support means for supporting said pantograph means for pivotal movement about a horizontal axis and for vertical movement;

a tool spindle and drive motor means for driving same;

worktable means mounted on said machine column means and including adjustment means for adjusting at least the height thereof;

adjustable pattern table means;

counterbalance spring means for balancing the weight of said pantograph means, said counterbalance spring means including means defining a series connected sleeved wire and counterbalance spring;

means defining a swingable arm having a control panel mounted thereon within easy access of a machine operator, one end of said counterbalance spring being connected to said console means and the remote end of said sleeved wire being connected to said swingable arm; and adjusting means within easy access of a machine operator for effecting an operation of said sleeved wire and consequent adjustment of the tension of said counterbalance spring, said adjusting means including a hand wheel mounted on said control panel and operatively connected to said remote end of said sleeved wire.

2. The engraving and copy milling macine according to claim 1, wherein said adjustment means on said worktable means includes means for supporting said worktable means for movement in a transverse direction; and wherein said machine column means is at most as high as the lower edge of said worktable means in its lowermost position.

3. The engraving and copy milling machine according to claim 1, wherein the vertical range of adjustment of said worktable means in the uppermost position overlaps that of a tool in its lowermost position.

4. The engraving and copy milling machine according to claim 1, wherein said drive motor means is mounted for driving said tool spindle fixedly on said console carrying said pantograph.

5. The engraving and copy milling machine according to claim 1, wherein said console means is movable by a spindle drive which can selectively be operated manually.

* * * * *